W. AIKEN.
Chucks for Screw-Threadings.

No. 149,626.                             Patented April 14, 1874.

Witnesses.
S. N. Piper.
L. W. Miller.

Walter Aiken,
by his attorney
R. H. Eddy

UNITED STATES PATENT OFFICE.

WALTER AIKEN, OF FRANKLIN, NEW HAMPSHIRE.

IMPROVEMENT IN CHUCKS FOR SCREW-THREADING.

Specification forming part of Letters Patent No. 149,626, dated April 14, 1874; application filed March 25, 1874.

CASE No. 2.

*To all whom it may concern:*

Be it known that I, WALTER AIKEN, of Franklin, of the county of Merrimack and State of New Hampshire, have invented a new and useful Improvement Relating to the Spindles or Arbors of Screw-Threading Machines; and do hereby declare the same to be fully described in the following specification and represented in the accompanying drawings, of which—

Figure 1:
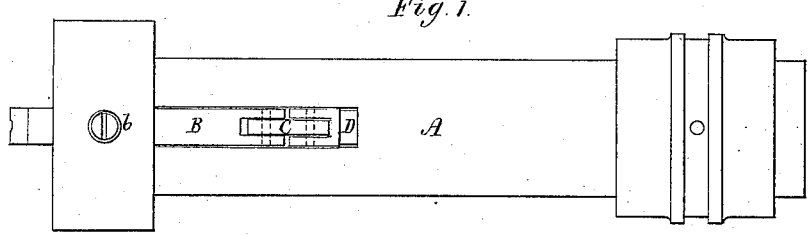
Figure 2:
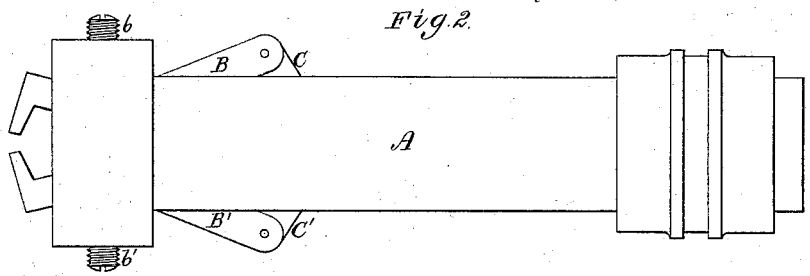
Figure 3:
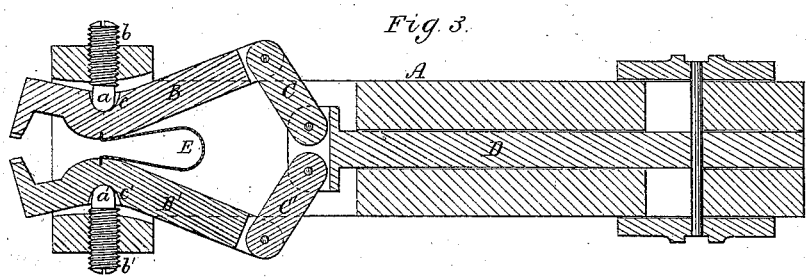

Figure 1 is a top view, Fig. 2 a side elevation, and Fig. 3 a longitudinal section, of a screw-threader spindle, having its jaw-levers, pivots, and spring arranged and constructed in accordance with my invention.

The pivots $a$ $a'$ of the jaw-levers are spherical projections, provided with adjusting-screws $b$ $b'$, each pivot and the screw thereof being in one piece of metal, and shaped as shown. The screws, nicked on their outer ends, screw in opposite directions, diametrically into the spindle A, the pivots entering corresponding concavities $c$ $c'$, formed in the two jaw-levers B B', whose longer arms are hinged to two toggles, C C'. These toggles in turn are hinged to a slide-rod, D, arranged within the spindle in manner as shown. There is between the two jaw-levers a U-spring, E, which, at its ends, is bent at right angles, and inserted in notches in the two levers, all being as shown in Fig. 3. The spring, so arranged and applied, will move with and adapt itself to the levers, not only while they may be in the act of being adjusted by the pivot-screws, but while they may be in movement on their special pivots. The spring operates to keep the jaw-levers in engagement with their pivots. Were it not for it, they would be liable to get off the pivots. These jaw-levers are operated by means of the toggles and slide for the purpose of grasping and holding a screw-blank by its shank to enable it to be threaded. The lever-jaws require adjustment for blanks of different sizes, and this can readily be effected by the adjustable spherical pivots and their screws, as described.

I claim as my invention—

The combination of the spherical pivots $a$ $a'$ and the adjusting-screws $b$ $b'$ thereof, arranged as described, with the jaw-levers B B', and their spindle A, and the spring E, disposed between and applied to the jaw-levers, all being substantially as shown and described.

WALTER AIKEN.

Witnesses:
R. H. EDDY,
J. R. SNOW.